Jan. 3, 1933.  E. G. HILL  1,893,471
CLUTCH OPERATING MECHANISM FOR MOTOR VEHICLES
Filed Oct. 8, 1930  2 Sheets-Sheet 1
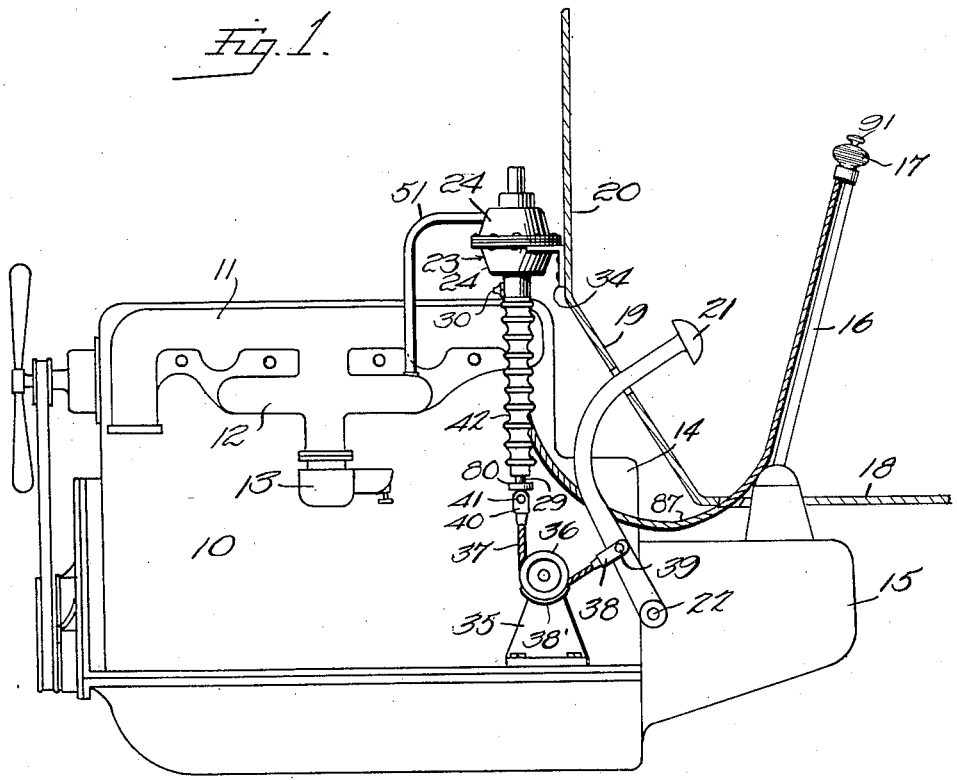
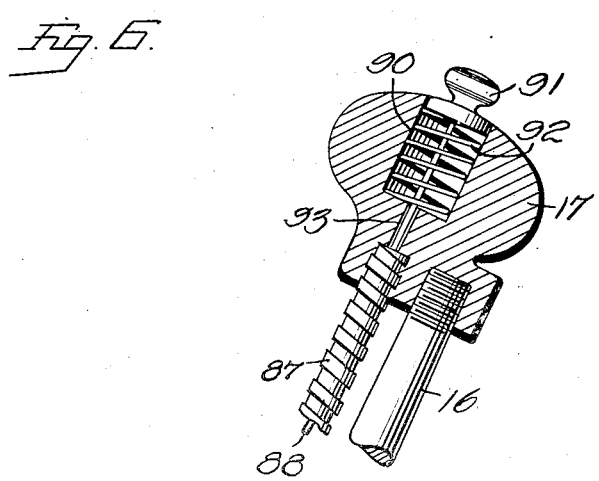
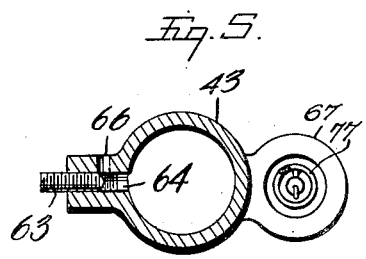
Inventor
EDWARD G. HILL

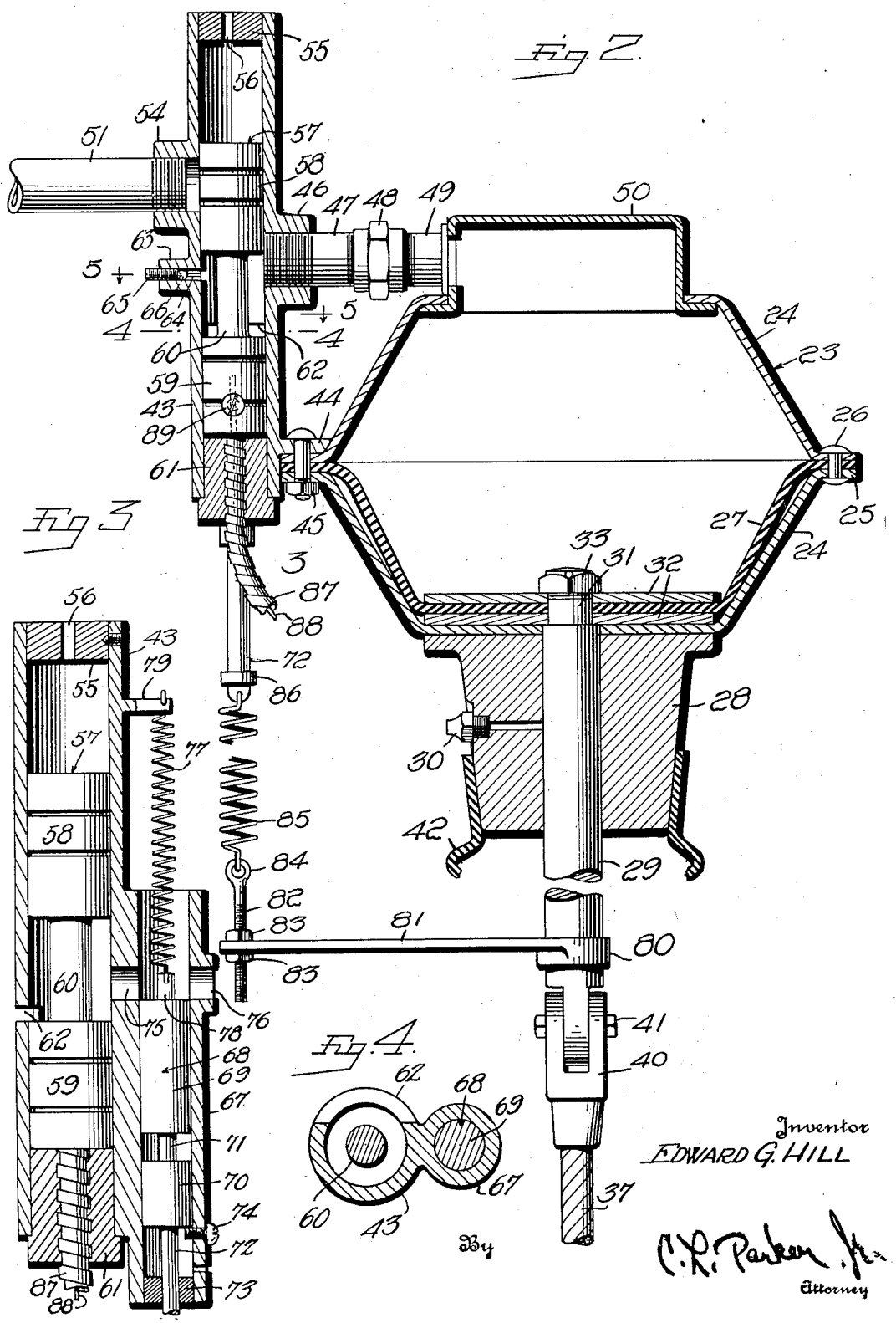

Patented Jan. 3, 1933

1,893,471

UNITED STATES PATENT OFFICE

EDWARD G. HILL, OF RICHMOND, VIRGINIA, ASSIGNOR TO HILL ENGINEERING CORPORATION, OF RICHMOND, VIRGINIA, A CORPORATION OF VIRGINIA

CLUTCH OPERATING MECHANISM FOR MOTOR VEHICLES

Application filed October 8, 1930. Serial No. 487,319.

This invention relates to clutch operating mechanisms for motor vehicles.

In my copending application Serial No. 480,598, filed September 8, 1930, I have disclosed a simplified form of clutch operating means for motor vehicles which utilizes differential pressure for moving the clutch elements out of engagement instead of the usual operation which involves depressing the clutch pedal with the foot. A valve device is provided having control means therefor operative for connecting a differential pressure device with a source of differential pressure to cause the clutch to be disengaged, and engagement of the clutch takes place automatically upon the releasing of the control means. The valve devices operate automatically as the clutch returns toward normal or engaged position, in such a manner that the clutch parts move rapidly toward normal position up to the point where the elements are about to engage with each other, at which point the movement of the parts is checked to permit the clutch elements to come smoothly into engagement. This operation simulates the usual manual operation of the parts, but takes place automatically, as stated.

In the previous construction referred to, the differential pressure device is normally cut off from communication with the atmosphere and with the source of differential pressure by the valve means provided, and while the device has operated with perfect satisfaction, it is conceivable that some leakage may occur through the valve means whereby slight communication would be established between the differential pressure device and the source of differential pressure whereby the former would partake of sufficient movement to take up the play in the throw-out bearing of the clutch, causing some undesirable wear therein.

In the prior construction referred to, the automatic means for controlling the return of the clutch to normal position is the same under all conditions. In other words, the clutch returns to normal position in the same manner when shifting from first to second gear or from second to third gear as it does when first starting the vehicle and going into first gear. In actual practice, however, it is not necessary for the clutch elements to move as gradually into position when going into second or third gears as is true when going into first gear upon starting the vehicle. The prior construction referred to accordingly requires a slightly greater period of time for its operation under some conditions than is necessary, and while this condition is not particularly objectionable, it can be overcome in the manner to be referred to.

An important object of the present invention is to provide a construction which is an improvement over the structure disclosed in my prior application referred to in that the device is not subject to any possibility of leakage between the pressure operated device and the source of differential pressure which could cause any movement of the former, and accordingly wear in the clutch throw-out bearing is prevented.

A further object is to provide novel valve means for controlling communication between the pressure operated device and the source of differential pressure wherein the former normally has free communication with the atmosphere to prevent any possible leakage through the valve mechanism from moving the pressure responsive means.

A further object is to provide a device of the character referred to which may be controlled manually to release the clutch and wherein means controllable by the operator normally operates to retard the movement of the clutch elements to normal position in engagement with each other to prevent the grabbing of the elements, such means being controllable to permit engagement of the clutch elements to take place more rapidly under certain conditions of operation.

A further object is to provide valve means for a device of the character referred to which permits rapid communication between the pressure responsive device and the atmosphere to permit the clutch elements to move rapidly toward normal position and to substantially cut off communication with the atmosphere when the clutch elements are about to become engaged, and to provide means for preventing the movement of the clutch elements from being too greatly retarded under certain conditions.

Other objects and advantages of the invention will become apparent during the course of the following description.

In the drawings I have shown one embodiment of the invention. In this showing,

Figure 1 is a side elevation of a motor vehicle engine and associated elements, parts being shown in section, and the invention being shown applied.

Figure 2 is a central vertical sectional view through the pressure responsive device and associated elements, Figure 3 is a vertical sectional view on line 3—3 of Figure 2, Figure 4 is a transverse sectional view on line 4—4 of Figure 2, Figure 5 is a similar view on line 5—5 of Figure 2, and, Figure 6 is a detail section through the upper end of the gear shift lever and associated elements, parts being shown in elevation.

Referring to Figure 1 the numeral 10 designates a motor vehicle engine having the usual exhaust manifold 11 and intake manifold 12, the latter being connected to the usual carbureter 13. A clutch housing 14 is mounted rearwardly of the engine and connects the latter to the elements of a gear set 15. The gear set is provided with the usual gear shift lever 16 having a knob 17 at its upper end to be referred to in detail later.

The gear shift lever and associated elements project upwardly through the floor 18 of the vehicle, the forward portion of the floor being sloped upwardly as at 19 and connected to a dash 20. The usual clutch pedal 21 operates through a slot in the sloping floor boards 19. and is connected to the clutch control shaft 22. With the exception of the gear shift knob 17, the elements of the device referred to form no part of the present invention and constitute standard practice in automobile manufacture.

Referring to Figure 2, the numeral 23 designates a diaphragm housing as a whole comprising upper and lower frustro-conical sections 24 having their adjacent edges flanged as at 25 to receive rivets 26 or other fastening elements whereby the sections may be secured to each other. A diaphragm 27 has its peripheral portion arranged between the flanges 25 to be secured in position by the elements 26.

A bearing 28 is welded or otherwise secured against the bottom of the lower casing section 24 and supports a rod 29 for reciprocating movement. The bearing 28 may be lubricated in any suitable manner, as for example, by means of a pressure fitting 30. The upper end of the rod 29 is reduced as at 31 to extend through the diaphragm 27 and through disks 32 arranged on opposite sides of the diaphragm. A nut 33 is threaded on the upper end of the rod 29 to secure the latter to the diaphragm and to the disks 32. The casing 23 and elements associated therewith constitute a pressure responsive device for operating the clutch, and this device may be secured in position on the vehicle in any suitable manner. In Figure 1, the pressure responsive device is shown as being secured to the dash 20 by means of a suitable bracket 34.

Referring to Figure 1, the numeral 35 designates a supporting bracket secured to any suitable part of the engine or vehicle and supporting a grooved pulley 36 at its upper end. This pulley receives a flexible cable 37, and a guard 38' is adapted to prevent the cable from becoming displaced from the groove of the pulley. One end of the cable is provided with a fitting 38 pivotally connected as at 39 to the clutch pedal 21. A similar fitting 40 is connected to the other end of the cable and is pivotally connected as at 41 to the lower end of the rod 29. The collection of dust or other foreign material on the rod 29 is prevented by means of a rubber or other longitudinally collapsible casing 42. The upper end of this casing surrounds the bearing 28, as shown in Figure 2, while the lower end surrounds the rod 29 at a point spaced a substantial distance below the bearing 28.

A valve housing 43 is arranged adjacent the diaphragm housing and is provided with a flange or lug 44 secured to the diaphragm housing by one of the fastening elements by means of which the sections of the housing are secured to each other. A bolt 45 preferably is employed for this purpose to permit it to be readily removed if desired. One side of the valve housing 43 is provided with an internally threaded boss 46 receiving one end of a pipe 47. The end of this pipe is connected by a union 48 to a short pipe section 49, which in turn is connected to a dome 50 secured to and communicating with the interior of the upper section 24 of the diaphragm housing.

The interior of the valve housing is adapted to communicate with a source of differential pressure through a pipe 51 threaded into a boss 54 preferably formed integral with the valve casing 43. The other end of the pipe 51 is connected to the intake manifold 12 as shown in Figure 1. A plug 55 is arranged in the upper end of the valve housing and is vented to the atmosphere through a small opening 56.

A valve indicated as a whole by the numeral 57 is mounted to reciprocate in the housing 43. This valve is provided with upper and lower heads 58 and 59 connected to each other by a preferably integral reduced portion or shank 60. The valve normally occupies the position shown in Figure 2 with the lower end of the valve supported upon the upper end of a plug 61 closing the lower end of the valve housing.

The valve housing is provided with a circumferential slot 62 arranged just above the valve head 59 when the latter is in normal position, as shown in Figure 2. This opening affords free communication under normal conditions between the atmosphere and the space surrounding the shank 60. The valve housing 43 is provided above the vent opening 62 with a boss 63 having a passage 64 therethrough, and an adjusting screw 65 is threaded on the outer end of the opening 64. The boss 63 is drilled laterally to provide a vent opening 66 as shown in Figures 2 and 5, and communication between the atmosphere and the space around the shank 60, through the passages 64 and 66, can be readily controlled by adjusting the screw 65.

An auxiliary valve housing 67 is arranged adjacent and parallel to the valve housing 43, and is preferably formed integral therewith. A control valve 68 is mounted to reciprocate in the housing 67 and includes upper and lower heads 69 and 70 connected together by a reduced shank 71. The valve 68 is carried by the upper end of a valve stem 72 which is slidable in a bushing 73 arranged in the lower end of the housing 67. A set screw 74 limits the downward movement of the control valve to the position shown in Figure 3.

A port 75 extends through the wall between the valve housings 43 and 67 to connect the interiors of the valve housings to each other when the valve is in normal position and under such conditions, the port 75 communicates with the atmosphere through the open top of the valve housing 67 and through a port 76 extending through the outer wall of the housing 67. In order to close communication between the port 75 and the atmosphere under certain conditions to be described, a light tension spring 77 normally urges the valve 68 upwardly. This spring is connected at its lower end to an eye 78 carried by the valve 68, and at its upper end to a lug 79 carried by the valve housing 43.

A collar 80 is connected to the rod 29 adjacent its lower end, and a rigid arm 81 projects laterally from the collar, as shown in Figure 2. A rod 82 passes through the free end of the arm 81 and is secured in adjusted positions with respect thereto by nuts 83 threaded thereon. The rod 82 is provided at its upper end with an eye 84 connected to the lower end of a spring 85. This spring is connected at its upper end to the lower end of the valve stem 72 as at 86.

A section of flexible guide tubing 87 has its upper end extending through the plug 60, as shown in Figure 2. A flexible wire 88 extends through the tubing 87 and projects into an opening in the bottom of the valve head 59. A set screw 89 secures the wire 88 to the valve head 59, as shown in Figure 2.

Referring to Figures 1 and 2, it will be noted that the gear shift knob 17 has its body offset grom the lever 16, and the tubing 87 extends into the bottom of the knob as shown. A recess 90 is formed in the top of the knob 17, and a push button 91 has its bottom portion arranged in the recess 90. A coil spring 92 is arranged in the recess 90 and urges the button 91 upwardly. The wire 88 extends into the recess 90 through an opening 93 in the gear shift knob, and the upper end of the wire is secured to the button 91.

The operation of the device is as follows:

The parts normally occupy the positions shown in Figure 2, the space above the diaphragm 27 communicating with the atmosphere through the passages 64 and 66, the port 62, and the piping connections between the valve housing 43 and the dome 50. The spring elements of the clutch hold the mechanical elements in normal position, the movement of the clutch pedal to normal position obviously holding the cable 37 and associated elements in the positions shown in Figure 2. The spring 85 is much stronger than the spring 77, and accordingly when the arm 81 is in lowermost position, the force transmitted to the valve stem 72 by the spring 85 holds the valve 68 in lower position. In this connection, it will be noted that the space between the valve heads 58 and 59 also communicates with the atmosphere through the port 75, although this communication is not essential when the parts are in normal position due to the fact that the upper casing section 24 communicates with the atmosphere in the manner previously described.

When it is desired to shift to first gear, the operator depresses the button 91, which movement is transmitted through the wire 88 to the valve 57, and the latter is elevated to establish communication between the pipes 51 and 47 around the stem 61. The movement of the valve referred to causes the lower head 59 to close the ports 62, 64 and 75, thus cutting off the dome 50 from communication with the atmosphere. Under the conditions referred to, communication will be established between the upper casing section 24 and the intake manifold 12, thus establishing a pressure differential on opposite sides of the diaphragm 27, causing the latter to move upwardly. This movement elevates the rod 29 and pulls the cable 37, and thus the pedal 21 will be moved to depressed position to disengage the clutch.

The arm 81 moves upwardly with the rod 29, thus reducing the tension of the spring 85 until such tension is overcome by the tension of the spring 77, whereupon the valve 68 will be moved upwardly until the collar 86 engages the plug 73, at which point the space around the shank 71 communicates with the port 75, this port obviously communicating with the atmosphere under such conditions through the space around the shank 71. The port 75 will have been closed, however, by the upward movement of the valve 57, and accordingly a pressure differential may be maintained on opposite sides of the diaphragm 27 so long as the button 91 is held depressed.

After the clutch has been disengaged in the manner referred to, the knob 17 is moved into first gear position, after which it is desired to release the clutch pedal to start the vehicle in accordance with standard practice. When going into first gear, the operator releases the button 57 to permit it to travel nearly, but not quite to normal position, and with some practice, the operator readily may permit the valve 57 to return to such a position that the upper end of the valve head 59 will just cover the port 62. Under such conditions, the valve head 58 will close communication with the intake manifold through pipe 51, and air will flow into the diaphragm chamber through ports 76 and 75, through the interior of the valve casing 43 around the shank 60, and thence through the pipes 47 and 49. Thus there will be a rapid tendency to establish equalized pressures on opposite sides of the diaphragm 27, and the clutch springs will move the clutch elements rapidly toward engaged position, this movement also being transmitted to the clutch pedal 21, cable 37 and rod 29, and the latter element will start to move downwardly.

Before the clutch elements reach operative position, the tension of the spring 85 will be increased to such a point that it will overbalance the tension of the spring 77 and the valve 68 will be moved downwardly toward normal position and the valve head 69 will close the port 75. When the upper casing section 24 is thus cut off from free communication with the atmosphere, the movement of the diaphragm and associated parts will be checked to prevent the clutch elements from being too rapidly engaged. At this time, the ports 64 and 66 perform their functions of permitting a slow flow of air into the valve casing 43, and this air will be communicated to the upper chamber 24 to permit slow downward movement of the diaphragm whereby the clutch elements will be relatively slowly brought into engagement with each other without any grabbing action.

As soon as the clutch has become fully engaged, the operator picks up speed to the point where he is ready to shift to second gear, whereupon the button 91 is again depressed to cause the clutch to be disengaged. The gear shift lever is then moved into a second gear position, whereupon the clutch is again rendered operative by releasing the button 91, except that in this case, the button is completely released. In this connection, it will be noted that the clutch elements do not "grab" very readily when the vehicle is in second gear, and accordingly the button 91 may be completely released to permit the valve 57 to move to normal position and uncover the port 62. The conditions of operation will then be the same as in the previous case except that a more rapid flow of air into the upper chamber 24 will be permitted by virtue of the uncovering of the port 62. The clutch however, will not "grab" when in second gear, and the same also is true when in high gear.

Accordingly it will be apparent that it is only desirable to keep the port 62 covered when in first gear to permit "grabbing" of the clutch elements, and the valve 57 may be permitted to freely return to normal position when in intermediate and high gears.

The nuts 83 may be adjusted on the rod 82 to determine the point at which the valve 68 will be moved downwardly when the rod 29 moves downwardly and the rate of checking of the movement of the diaphragm 27 when in first gear may be adjusted by turning the screw 65. Thus the point at which the diaphragm 27 is checked in its movement, and the rate of movement of the diaphragm after it has been checked, readily may be adjusted.

As previously stated, the upper casing section 24 is normally in communication with the atmosphere, and accordingly any slight leakage which may occur past the valve head 58 cannot cause a pressure differential to be established on opposite sides of the diaphragm 27. Accordingly there cannot be any "grabbing" of the diaphragm, which might cause the play in the clutch throw-out bearing to be taken up to cause any possible wearing of the latter and slippage of the clutch elements.

The collapsible tubing 42 is preferably provided to prevent accumulation of dirt or other abrasive material on the rod 29.

The operation of the device is positive, and it is readily controlled to permit the clutch to be operated exactly in accordance with standard practice, the depression of the clutch pedal against the strong springs provided in the clutch being unnecessary.

It will be noted that the device is flexibly connected to the usual clutch pedal, none of the conventional clutch devices being altered or removed. Accordingly, it will be obvious that the clutch may be operated by the foot in accordance with the usual practice, if it should become desirable or necessary.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. Apparatus of the character described comprising a power device connected to an operating member of a motor vehicle clutch, a control device operable for rendering said power device operative to move the clutch to inoperative position, and automatic means operative as the elements of the clutch approach operative position for retarding the movement of such elements, said control device including a member manually controllable for rendering said automatic means substantially ineffective for retarding the clutch elements.

2. Apparatus of the character described comprising a power device connected to an operating member of a motor vehicle clutch having a normal bias to operative position, a control device for rendering the power device operative to move the clutch elements to inoperative position and releasable to permit the clutch elements to return to normal position, and automatic means rendered operative as the elements of the clutch approach operative position for retarding the movement of such elements, said control device including an element controllable to render said automatic means substantially ineffective for retarding the clutch elements.

3. Apparatus of the character described comprising a power device including a chamber having a member therein operative by differential pressure, means connecting said member to a motor vehicle clutch, valve mechanism normally operative for establishing pressure equalization in said power device and operable for establishing differential pressure therein, and a control device for rendering said valve mechanism operative and releasable to permit it to become inoperative, said valve mechanism including automatic means operative upon the partial release of said control device for retarding the movement of the clutch elements as they approach operative position, said control device being controllable to render said automatic means substantially ineffective for retarding the clutch elements.

4. Apparatus of the character described comprising a differential pressure power device including a member therein operative by differential pressure and connected to a motor vehicle clutch having a normal bias to operative position, a valve device having a normal bias to one position for establishing pressure equalization on opposite sides of said member and being provided with manual means to move it to a second position to connect said power device to a source of differential pressure, and an auxiliary device automatically operative after the return of said valve device to a point intermediate operative and normal positions for restricting the establishment of pressure equalization in said power device as the clutch elements approach operative position, said valve device being provided with a port open to the atmosphere when the valve device returns fully to operative position to render said auxiliary device substantially ineffective for restricting the establishment of pressure equalization in said power device.

5. Apparatus of the character described comprising a power device including a member therein operative by differential pressure on opposite sides thereof and connected to a motor vehicle clutch having a normal bias to operative position, a valve casing having a valve therein and provided with a port open to the atmosphere and communicating with said power device when said valve is in normal position to establish pressure equalization therein, an auxiliary valve associated with said first named valve, and manual means for controlling said first named valve whereby it may be moved to operative position to close said port and establish a pressure differential in said power device, and releasable to permit said first named valve to return to normal position, said auxiliary valve being operative when said first named valve approaches operative position without uncovering said port for retarding movement of the clutch elements as they approach engaging position.

6. Apparatus of the character described comprising a power device including a chamber having a member therein operative by differential pressure on opposite sides thereof and connected to a motor vehicle clutch having a normal bias to operative position, a valve housing having one port communicating with a source of differential pressure, a second port communicating with said chamber, and a third port communicating with the atmosphere, a valve mounted in said housing and normally occupying a position closing said first port and affording communication between said second and third ports, said valve being biased to normal position, manual means for moving said valve to operative position to afford communication between said first and second ports and closing said third port, said manual means being partially releasable to permit said valve to return to an intermediate position in which said first and third ports are closed and said second port is open, and an auxiliary valve automatically movable to operative position when said power device is operative and communicating with said second port when said first named valve is in normal or intermediate positions, and means operative when said first named valve returns to normal or intermediate positions and as the clutch elements are about to become engaged for moving said auxiliary valve to normal position to cut off communication between said second port and the atmosphere through said auxiliary valve.

7. Apparatus constructed in accordance with claim 6 wherein said auxiliary valve is provided with spring means constantly tending to move it to operative position, and spring means connected between said auxiliary valve and the clutch and operative for overcoming said first named spring means to move said auxiliary valve to normal position as the clutch elements approach engaging position.

8. Apparatus of the character described comprising a power device including a chamber having a member therein operative by differential pressure on opposite sides thereof, means connecting said member to a motor vehicle clutch having a normal bias to operative position, a valve housing having four ports, the first port being connected to a source of differential pressure, the second to said chamber on one side of the member therein, and a third to the atmosphere, a valve mounted in said housing and normally occupying a position affording communication between said second and third ports and closing said first port, and movable to an operative position to establish communication between said first and second ports and close said third port to establish a pressure differential in said chamber and move the clutch to inoperative position, a manual device operable for moving said valve to operative position and releasable to permit said valve to return to normal position, said manual device being adapted to be stopped in its releasing movement to position said valve in an intermediate position in which said first and third ports will be closed and said second port opened, an auxiliary valve movable to operative position to afford communication between said fourth port and the atmosphere when the clutch is released, said first named valve when in operative position closing said fourth port and opening such port when released for movement to normal or intermediate positions, and means operative as the clutch approaches operative position for causing said auxiliary valve to close said port to retard the establishment of equalized pressures in said chamber.

9. Apparatus constructed in accordance with claim 8 wherein the means for causing said auxiliary valve to close the fourth port comprises a spring arranged between said valve and the means for connecting the member in said chamber to the clutch, said valve being provided with a spring normally tending to move said auxiliary valve to operative position.

10. The combination with a motor vehicle clutch and an operating member therefor, of a power device connected to said operating member and operable for disengaging the clutch, a control device movable from normal position for rendering said power device operative, and automatic means operative as the elements of the clutch approach operative position for retarding the movement of such elements, said control device including means for rendering said automatic means substantially ineffective for retarding the clutch elements.

11. The combination with a motor vehicle clutch and an operating member therefor, of a power device including a chamber having a member therein operable by a differential pressure on opposite sides thereof, means connecting said member to the operating member of the clutch, manually controlled valve mechanism operable for establishing a pressure differential in said chamber for moving the clutch elements to disengaged position, said valve mechanism having a normal bias to one position for establishing pressure equalization in said chamber and movable to such position when released, means controlling said valve mechanism to permit it to be partially released to move to a position in which rapid equalization of pressure in said chamber will be prevented, and means automatically operative after said valve mechanism is partially released and as the clutch elements approach operative position for retarding the movement of the clutch elements.

12. The combination with a motor vehicle clutch having a normal bias to operative position and an operating member therefor, of a power device connected to the operating member, a control device for rendering the power device operative to move the clutch elements to inoperative position and releasable to permit the clutch elements to return to normal position, and automatic means rendered operative as the elements of the clutch reach approximately the point of initial engagement for checking the movement of such elements, said control device including an element controllable to render said automatic means substantially ineffective for checking the movement of the clutch elements.

13. The combination with a motor vehicle clutch having a normal bias to operative position and an operating member therefor, of a power device including a chamber having a member therein operative by differential pressure, means connecting said member to the operating member of the clutch, valve mechanism normally operative for establishing pressure equalization in said power device and operable for establishing pressure differential therein, and a control device for rendering said valve mechanism operative and releasable to permit it to become inoperative, said valve mechanism including automatic means operative upon the partial release of said control device for checking the movement of the clutch elements as they reach approximately the point of initial engagement, said control device being controllable to render said automatic means substantially ineffective for checking the movement of the clutch elements.

14. The combination with a motor vehicle clutch having a normal bias to operative position, of a power device connected to the clutch, control mechanism for rendering the power device operative to move the clutch elements to inoperative position and to permit the clutch elements to return to normal position, and automatic means rendered operative as the elements of the clutch reach approximately the point of initial engagement for checking the movement of such elements, said control mechanism being subject to control independently of said automatic means for rendering the latter ineffective for substantially retarding the movement of the clutch elements.

15. The combination with a motor vehicle clutch having a normal bias to operative position, of a power device including a chamber having a member therein operative by differential pressure and connected to the clutch, valve mechanism normally operative for establishing pressure equalization in said power device and operable for establishing pressure differential therein, and an automatic valve operative in conjunction with said valve mechanism for checking the movement of the clutch elements as they reach approximately the point of initial engagement, said valve mechanism being subject to control independently of said automatic valve for rendering the latter ineffective for substantially retarding the movement of the clutch elements.

16. Apparatus of the character described comprising a power device connected to a motor vehicle clutch having a normal bias to operative position, control mechanism for rendering the power device operative to move the clutch elements to inoperative position and to permit the clutch elements to return to normal position, and automatic means rendered operative as the elements of the clutch reach approximately the point of initial engagement for checking the movement of such elements, said control mechanism being subject to control independently of said automatic means for rendering the latter ineffective for substantially retarding the movement of the clutch elements.

17. Apparatus of the character described comprising a power device including a chamber having a member therein operative by differential pressure and connected to a motor vehicle clutch having a normal bias to operative position, valve mechanism normally operative for establishing pressure equalization in said power device and operable for establishing pressure differential therein, and an automatic valve operative in conjunction with said valve mechanism for checking the movement of the clutch elements as they reach approximately the point of initial engagement, said valve mechanism being subject to control independently of said automatic valve for rendering the latter ineffective for substantially retarding the movement of the clutch elements.

In testimony whereof I affix my signature.

EDWARD G. HILL.

DISCLAIMER 1,893,471.—*Edward G. Hill*, Richmond, Va. CLUTCH OPERATING MECHANISM FOR MOTOR VEHICLES. Patent dated January 3, 1933. Disclaimer filed December 2, 1936, by the assignee, *Hill Engineering Corporation*.

Hereby enters its disclaimers to claims 1, 2, 10, 12, 14, 15, 16, and 17 of said specification.

[*Official Gazette December 29, 1936.*]